US009807852B1

United States Patent
Starner et al.

(10) Patent No.: US 9,807,852 B1
(45) Date of Patent: Oct. 31, 2017

(54) INTERACTIVE CORD WITH INTEGRATED LIGHT SOURCES

(71) Applicant: Google Inc., Mountain View, CA (US)

(72) Inventors: Thad Eugene Starner, Atlanta, GA (US); Karissa A. Sawyer, Santa Clara, CA (US); Greg Ellis Priest-Dorman, Berkeley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/202,465

(22) Filed: Jul. 5, 2016

Related U.S. Application Data (60) Provisional application No. 62/249,664, filed on Nov. 2, 2015.

(51) Int. Cl.
| | |
|---|---|
| *H05B 37/02* | (2006.01) |
| *H05B 33/08* | (2006.01) |
| *H04R 1/10* | (2006.01) |
| *H04W 68/00* | (2009.01) |

(52) U.S. Cl.
CPC ....... *H05B 37/0227* (2013.01); *H04R 1/1033* (2013.01); *H04R 1/1041* (2013.01); *H04W 68/00* (2013.01); *H05B 33/0842* (2013.01)

(58) Field of Classification Search
CPC .. H03K 17/962; H05B 37/02; H05B 37/0227; H05B 33/0842; G06F 3/044; H04R 1/1033; H04R 1/1041; H04W 68/00
See application file for complete search history.

(56) References Cited

U.S. PATENT DOCUMENTS

| | | | |
|---|---|---|---|
| 8,094,673 B2 | 1/2012 | Proctor et al. | |
| 2007/0237170 A1* | 10/2007 | Proctor | H04R 1/1033 370/462 |
| 2010/0116229 A1* | 5/2010 | Kojima | B60H 1/322 123/41.49 |
| 2011/0316611 A1* | 12/2011 | Gustavsson | H04R 5/00 327/516 |

(Continued)

OTHER PUBLICATIONS

Gilliland,"The Textile Interface Swatchbook: Creating Graphical User Interface-like Widgets With Conductive Embroidery", International Symposium on Wearable Computers (ISWC), Oct. 10, 2010, 8 pages.

(Continued)

*Primary Examiner* — Don Le
(74) *Attorney, Agent, or Firm* — Colby Nipper (57) ABSTRACT

This document describes an interactive cord with integrated light sources. An interactive cord includes a cable, and a fabric cover that covers the cable. The fabric cover includes one or more conductive threads woven into the fabric cover to form one or more capacitive touchpoints which are configured to enable reception of touch input. The fabric cover further includes one or more light sources. A controller, implemented at the interactive cord or a computing device coupled to the interactive cord, can detect touch input to a capacitive touchpoint and trigger one or more functions. In addition, the controller can control the light sources to output light to visually indicate a position of the capacitive touchpoint on the fabric cover and/or to provide feedback by outputting light responsive to detecting touch input to a respective capacitive touchpoint.

20 Claims, 8 Drawing Sheets

(56) References Cited

U.S. PATENT DOCUMENTS

| | | | |
|---|---|---|---|
| 2012/0184367 A1* | 7/2012 | Parrott | G06F 1/163 463/31 |
| 2013/0102361 A1* | 4/2013 | Colley | H04M 1/6058 455/557 |
| 2013/0120052 A1* | 5/2013 | Siska | H03K 17/962 327/517 |
| 2014/0294192 A1* | 10/2014 | Haynes | H04R 1/1041 381/74 |
| 2015/0212605 A1* | 7/2015 | Lien | G06F 3/044 345/179 |
| 2015/0334485 A1* | 11/2015 | Tyagi | H01B 11/22 381/74 |
| 2016/0100244 A1* | 4/2016 | Gentile | H04R 1/1041 345/174 |
| 2016/0284436 A1* | 9/2016 | Fukuhara | A41D 1/002 |

OTHER PUBLICATIONS

Komor,"Is It Gropable?—Assessing the Impact of Mobility on Textile Interfaces", International Symposium on Wearable Computers. Sep. 4, 2009, 5 pages.

Schoessler,"Cord UIs: Controlling Devices with Augmented Cables", TEI '15 Proceedings of the Ninth International Conference on Tangible, Embedded, and Embodied Interaction, 2015, 4 pages.

Zeagler,"Textile Interfaces: Embroidered Jog-Wheel, Beaded Tilt Sensor, Twisted Pair Ribbon, and Sound Sequins", 16th International Symposium on Wearable Computers, Jun. 18, 2012, 4 pages.

Schwarz, Julia et al., "Cord Input: an Intuitive, High-Accuracy, Multi-Degree-of-Freedom Input Method for Mobile Devices", Research Gate; Conference Paper, Jan. 2010, 5 pages.

* cited by examiner

INTERACTIVE CORD WITH INTEGRATED LIGHT SOURCES

RELATED APPLICATIONS

This application claims priority to U.S. Provisional Patent Application No. 62/249,664, filed Nov. 2, 2015, and titled "Interactive Cord with Integrated Light Sources," the disclosure of which is incorporated by reference in its entirety.

BACKGROUND

In-line controls for cords are standard and ubiquitous for devices such as earbuds or headphones for music players, cellular phone usage, and so forth. Similar in-line controls are also used by cords for household appliances and lighting, such as clocks, lamps, radios, fans, and so forth. Generally, such in-line controls utilize unfashionable hardware buttons attached to the cord which can break after extended use of the cord. Conventional in-line controls also have problems with intrusion due to sweat and skin, which can lead to corrosion of internal controls and electrical shorts. Further, the hardware design of in-line controls limits the overall expressiveness of the interface, in that increasing the amount of controls requires more hardware, leading to more bulk and cost.

SUMMARY

This document describes an interactive cord with integrated light sources. An interactive cord includes a cable, and a fabric cover that covers the cable. The fabric cover includes one or more conductive threads woven into the fabric cover to form one or more capacitive touchpoints which are configured to enable reception of touch input. The fabric cover further includes one or more light sources. A controller, implemented at the interactive cord or a computing device coupled to the interactive cord, can detect touch input to a capacitive touchpoint and trigger one or more functions. In addition, the controller can control the light sources to output light to visually indicate a position of the capacitive touchpoint on the fabric cover and/or to provide feedback by outputting light responsive to detecting touch input to a respective capacitive touchpoint.

This summary is provided to introduce simplified concepts concerning an interactive cord with integrated light sources, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for an interactive cord with integrated light sources are described with reference to the following drawings. The same numbers are used throughout the drawings to reference like features and components.

DETAILED DESCRIPTION

Overview

This document describes an interactive cord with integrated light sources. An interactive cord includes a cable, and fabric cover that covers the cable. The interactive cord may be implemented as a variety of different types of cords, such as a cord for headphones, earbuds, data transfer, lamps, clocks, radios, fans, and so forth. The fabric cover includes one or more conductive threads woven into the fabric cover to form one or more capacitive touchpoints which are configured to enable reception of touch input that causes a change in capacitance to the one or more conductive threads. A controller, implemented at the interactive cord or a computing device coupled to the interactive cord, can detect the change in capacitance and trigger one or more functions associated with the one or more capacitive touchpoints. For example, when implemented as a cord for a headset (e.g., headphones or ear buds), the controller can control audio to the headset, such as by playing the audio, pausing the audio, adjusting the volume of the audio, skipping ahead in the audio, skipping backwards in the audio, skipping to additional audio, and so forth.

Creating an interactive cord with capacitive touchpoints integrated into the fabric cover eliminates moving parts, hardware, bulk, unsightliness, and thickness found in existing in-line controls for cords. At the same time, the cost to manufacture the in-line controls is reduced because there are no extra hardware controls that must be electrically connected. Furthermore, the controller can be implemented to detect different types of touches to the capacitive touchpoints (e.g., hard presses versus light taps, pinches, or combinations or sequences of touches) thereby increasing the total number of different functions that can be triggered from the interactive cord.

In some cases, it may be difficult for a user to know where to touch the interactive cord, or whether touch input to the interactive cord has been detected and registered by the controller. Thus, in various implementations, the interactive cord includes one or more light sources (e.g., LEDs) integrated into the fabric cover. The light sources can be controlled to output light to indicate the position of the capacitive touchpoint. The light sources can also be controlled to output light to provide feedback to the user based on the user's interactions with the interactive cord. For example, a light source may be positioned proximate a capacitive touchpoint and output light to indicate the position of the touchpoint on the fabric cover. Then, when touch input to the capacitive touchpoint is received, the light source can be controlled to indicate that the touch input has been detected and registered, such as by changing colors, length, flashing, and so forth. In some cases, the light sources may be further controlled to output light to indicate various different notifications, such as to indicate an incoming call, a new song starting to play, a text message being received, and so forth.

When implemented as a power cord or a data transfer cord, the user may not know whether the interactive cord is receiving power or sending data through the cord. Thus, in one or more implementations, the light sources can be controlled to indicate the presence of power or data being transferred through the interactive cord. For instance, a light source can flash at a slow rate to show that power is being received when the interactive cord is plugged in to a device. Then, as the interactive cord starts to transfer the data, the light source can be controlled to flash faster, length or shorten, change colors, and so forth.

Example Environment

Figure 1:
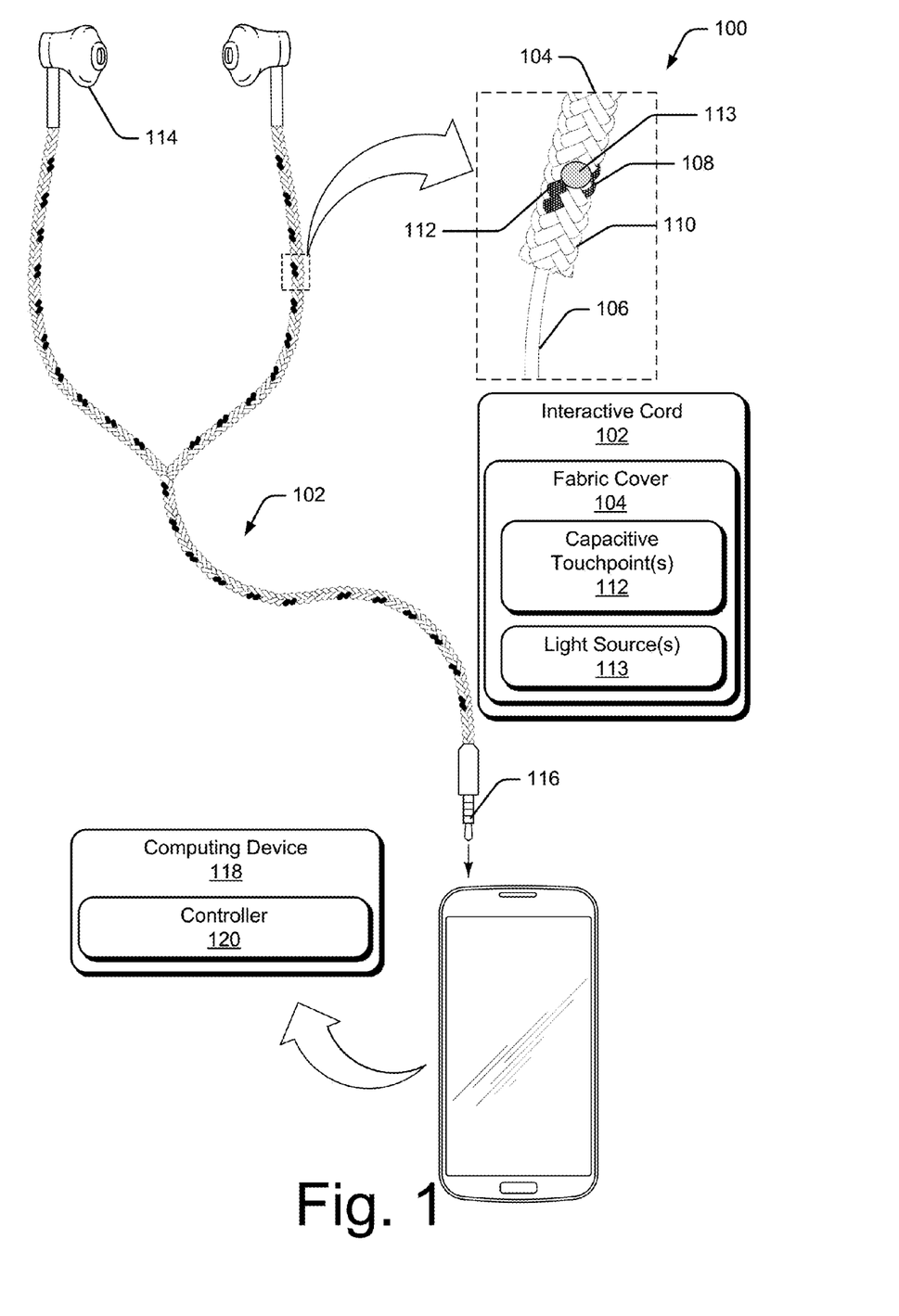
FIG. 1 is an illustration of an example environment in which techniques using, and objects including, an interactive cord with integrated light sources may be implemented.

FIG. 1 is an illustration of an example environment 100 in which techniques using, and objects including, an interactive cord with integrated light sources may be implemented. Environment 100 includes an interactive cord 102, which is illustrated as a cord for a headset. While interactive cord 102 will be described as a cord for a headset, such as earbuds or headphones, it is to be noted that interactive cord 102 may be utilized for various different types of uses, such as cords for appliances (e.g., lamps or fans), USB cords, SATA cords, data transfer cords, power cords, or any other type of cord that is used to transfer data or media.

Figure 2:
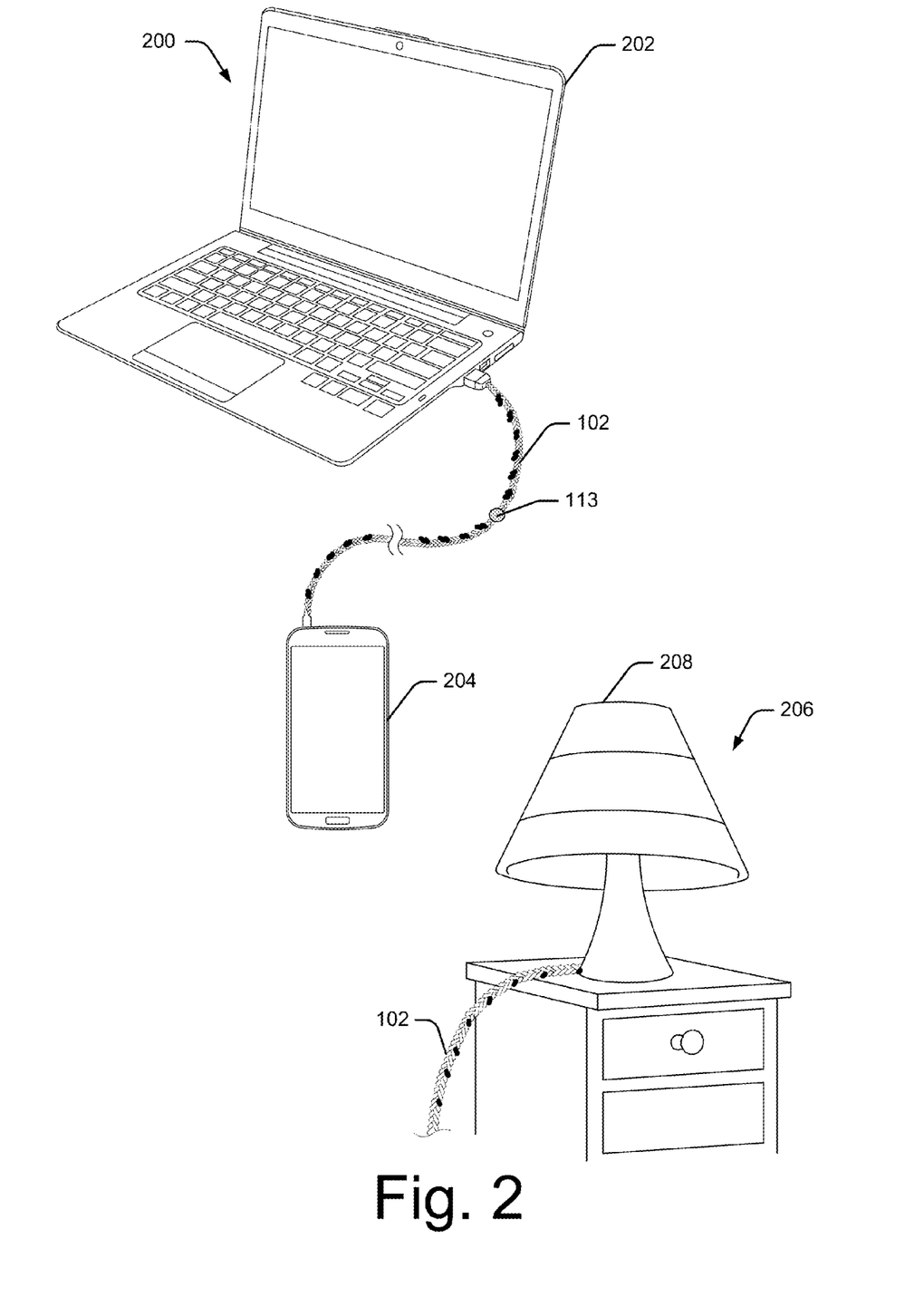
FIG. 2 illustrates additional environments in which an interactive cord with integrated light sources may be implemented.

Consider, for example, FIG. 2 which illustrates additional environments in which interactive cord 102 with integrated light sources can be implemented. At an environment 200, interactive cord 102 is implemented as a data transfer cord configured to transfer data (e.g., media files) between a computer 202 and a mobile device 204. In this example, interactive cord 102 may be configured to receive touch input usable to initiate the transfer, or pause the transfer, of data between computer 202 and mobile device 204.

As another example, at an environment 206, interactive cord 102 is illustrated as a power cord for a lamp 208. In this example, interactive cord 102 may be configured to receive touch input usable to turn on and off the lamp and/or to adjust the brightness of the lamp.

Returning to FIG. 1, interactive cord 102 includes a fabric cover 104 which is configured to cover a cable 106 of interactive cord 102. In FIG. 1, a cutaway shows an example of fabric cover 104 and cable 106 beneath the cover. In this example, cable 106 is configured to communicate audio data to headset. In other implementations, however, cable 106 can be implemented to transfer power, data, and so forth. In at least some implementations, fabric cover 104 may be configured to cover objects other than an interactive cord 102. For example, fabric cover 104 may be configured to cover a coffee mug, a case for a smartphone, and so forth.

Instead of using separate hardware controls, fabric cover 104 is configured to sense touch input using capacitive sensing. To do so, fabric cover 104 includes one or more conductive threads 108 that are woven, braided, or otherwise integrated with the fabric of fabric cover 104. Generally, conductive thread 108 corresponds to thread that is flexible, but includes a wire that changes capacitance in response to human input. For example, when a finger of a user's hand approaches conductive thread 108, the finger causes the capacitance of conductive thread 108 to change.

Figure 3:
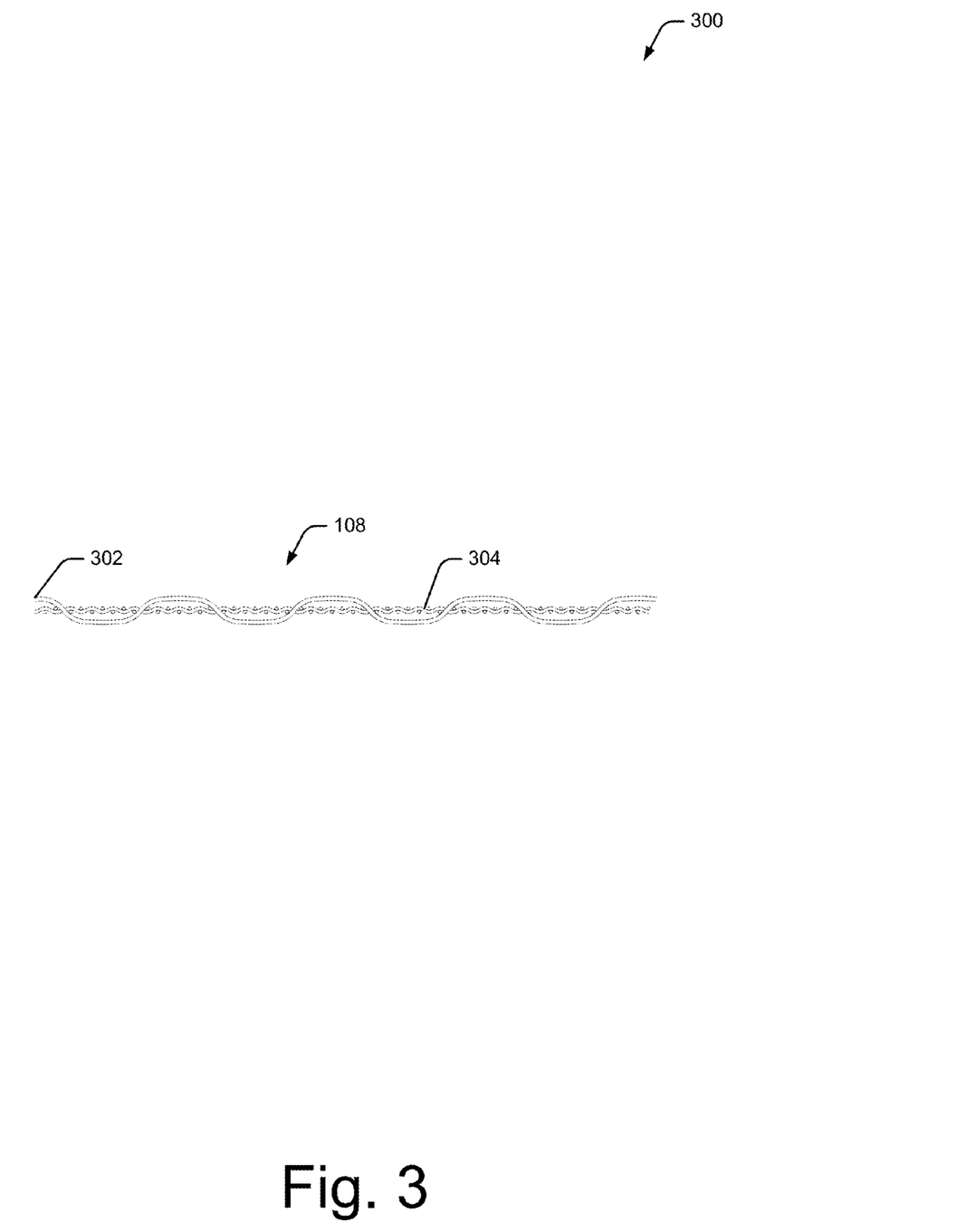
FIG. 3 illustrates an example of a conductive thread in accordance with one or more implementations.

Consider, for example, FIG. 3 which illustrates an example 300 of conductive thread 108 in accordance with one or more implementations. In this example, conductive thread 108 includes a conductive wire 302 that is combined with one or more flexible threads 304. Conductive wire 302 may be combined with flexible threads 304 in a variety of different ways, such as by twisting flexible threads 304 with conductive wire 302, wrapping flexible threads 304 with conductive wire 302, braiding or weaving flexible threads 304 to form a cover that covers conductive wire 302, and so forth. Conductive wire 302 may be implemented using a variety of different conductive materials, such as copper, silver, gold, or other materials coated with a conductive polymer. Flexible thread 304 may be implemented as any type of flexible thread or fiber, such as cotton, wool, silk, nylon, polyester, and so forth.

Combining conductive wire 302 with flexible thread 304 causes conductive thread 108 to be flexible and stretchy, which enables conductive thread 108 to be easily woven with one or more non-conductive threads 110 (e.g., cotton, silk, or polyester) to form fabric cover 104. Alternately, in at least some implementations, fabric cover 104 can be formed using only conductive threads 108.

To enable fabric cover 104 to sense touch input, the fabric cover is constructed with one or more capacitive touchpoints 112. As described herein, capacitive touchpoints 112 correspond to positions on fabric cover 104 that will cause a change in capacitance to conductive thread 108 when a user's finger touches, or comes in close contact with, capacitive touchpoint 112.

In one or more implementations, the weave pattern of fabric cover 104 exposes conductive thread 108 at the capacitive touchpoints 112. In FIG. 1, for example, conductive thread 108 is exposed at capacitive touchpoints 112, but is otherwise not visible. In some implementations, two or more conductive threads 108 may be substantially parallel to each other at capacitive touchpoints 112, but twisted together at other areas of fabric cover 104. The various ways in which capacitive touchpoints 112 can be integrated within fabric cover 104 are discussed in greater detail, below, with regards to FIG. 4.

In one or more implementations, capacitive touchpoints 112 are formed with a visual or tactile cue to enable the user to easily recognize the location of the capacitive touchpoint 112. In FIG. 1, for instance, conductive threads 108 are shown as being a different color (black) than the non-conductive threads 110 (white), thereby providing a visual cue to the user as to where the capacitive touchpoint is located.

In accordance with various implementations, fabric cover includes one or more light sources 113. Light sources 113 may correspond to any type of light source, such as light emitting diodes (LED's). In order to output light, light sources 113 may be powered by one or more conductive threads 112. For example, a light source 113 may be sewn, knotted, or soldered in line with a conductive thread 108 that powers the light source 113. Light sources 113 can be controlled to output light to visually indicate the position of a capacitive touchpoint 112 and/or to provide feedback to the user based on the user's interactions with interactive cord 102.

For example, light source 113 may be positioned proximate a capacitive touchpoint 112 and output light to indicate the position of the capacitive touchpoint 112 on fabric cover 104, thereby providing a visual cue to the user. Then, when touch input to the capacitive touchpoint 112 is received, light source 113 can be controlled to provide feedback to the user indicating that the touch input has been detected and registered, such as by changing colors, length, flashing, and so forth. In some cases, light source 113 is configured to output a first type of light (e.g., a particular color of light or flashing at a particular rate) to visually indicate the position of the capacitive touchpoint on the fabric cover, and to output a second, different, type of light (e.g., a different color of light or flashing at a different rate) to provide the feedback. For example, light source 113 can output red light to indicate the position of capacitive touchpoint 112, and then output blue light to provide feedback indicating that touch input to capacitive touchpoint 112 has been detected. As another example, light source 113 can flash at a slow rate to indicate the position of capacitive touchpoint 112, and then flash at a faster rate to provide feedback indicating that touch input to capacitive touchpoint 112 has been detected. As yet another example, light sources 113 may lengthen or shorten in one or more dimensions along the cord. It is to be appreciated that light sources 113 can be controlled in a variety of different ways to convey different types of information to the user.

In some cases, light source 113 may be controlled to output light to visually indicate the position of capacitive touchpoint 112 in response to receiving a notification (e.g., an incoming call or a text message being received) associated with the capacitive touchpoint 112. In this case, capacitive touchpoint 112 may be associated with the notification. For example, selection of a capacitive touchpoint may cause the incoming call to be answered. Thus, when the incoming call is received, a light source 113 associated with the corresponding capacitive touchpoint 112 can be controlled to provide a visual indication of the capacitive touchpoint 112 in order to let the user know that the corresponding capacitive touchpoint 112 can be selected to answer the incoming call. As another example, when the interactive cord is implemented as a headset, a light source proximate to an audio control (e.g., play, pause, next, volume up) may flash when the user opens a media player application on their device to let the user know that the audio control may be selected to control playback of audio files using the media player application.

When implemented as a power cord or a data transfer cord, the user may not know whether the interactive cord is receiving power or sending data through the cord. Thus, in one or more implementations, light sources 113 can be controlled to indicate the presence of power or data being transferred through interactive cord 102. For instance, in example 200 of FIG. 2, light source 113 can blink at a slow rate to show that power is being received when interactive cord 102 is plugged in between devices 202 and 204. Then, as interactive cord 102 starts to transfer the data, light source 113 can be controlled to blink faster, change colors, lengthen or shorten, and so forth.

In one or more implementations, light source 113 may be positioned at the base of interactive cord 102 (e.g., where interactive cord connects to a computing device) and coupled to one or more optical fibers that are integrated (e.g., woven) into fabric cover 104. The optical fiber can be integrated into fabric cover 104 such that its endpoint is proximate a capacitive touchpoint 112. In this way, light source 113 can emit light into the optical fiber to cause the endpoint of the optical fiber to output light (e.g., glow) proximate capacitive touchpoint 112. In one or more implementations, the optical fiber can be scuffed or nicked at a position proximate the capacitive touchpoint 112 to cause light traveling through the optical fiber via total internal reflectance to escape. In some cases, the optical fiber can be scuffed or nicked at multiple positions along fabric cover 104 to cause the optical fiber to output light at the multiple positions, each of which may be proximate a capacitive touchpoint 112.

In environment 100, interactive cord 102 includes earbuds 114 and a connector 116 that is configured to be plugged into a computing device 118. Computing device 118 is illustrated as a mobile phone, but may also be configured as a desktop computer, a laptop computer, a tablet device, a wearable device, and so forth. Thus, computing device 118 may range from full resource devices with substantial memory and processor resources (e.g., personal computers, game consoles) to low-resource devices with limited memory and/or processing resources (e.g., mobile devices).

Computing device 118 is illustrated as including a controller 120 which is representative of functionality to sense touch input to capacitive touchpoints 112 of interactive cord 102, and to trigger various functions based on the touch input. For example, when interactive cord 102 is implemented as a cord for a headset, controller 120 can be configured to, in response to touch input to capacitive touchpoints 112, start playback of audio to the headset, pause audio, skip to a new audio file, adjust the volume of the audio, and so forth.

Controller 120 is further configured to control light sources 113 to output light in a variety of different ways, such as by turning the light sources on and off, outputting a particular color of light, flashing, blinking, lengthening or shortening, and so forth. In some cases, controller 120 may power light sources 113 by sending current through a separate wire connected to the light sources 113. In one or more implementations controller 120 can power light sources 113 by sending current through conductive thread 108 that is connected to light sources 113. In this case, conductive thread 108 may be attached to power on one side and ground on the other. Notably, conductive thread 108 has a natural electrical resistance which may be sufficient to limit the current going through to the light sources so as to avoid burning out light sources 113.

In some instances, the conductive thread 108 that powers a light source 113 may be configured to exclusively power one or more light sources 113. In this case, controller 120 controls light sources 113 by causing current to be sent through a conductive thread 108 coupled to the light source 113 to power the light source 113. Alternately, one or more of the conductive threads 108 can be used to both form a capacitive touchpoint 112 and to power a light source 113. In this case, controller 120 is configured to switch between sending current through the conductive thread 108 to power the light source 113, and monitoring the conductive thread 108 to detect touch input at the capacitive touchpoint 112 formed by the conductive thread. Controller 120 may quickly switch between sending current the monitoring for touch input such that any flickering of light source 113 is imperceptible to the user.

In FIG. 1 controller 120 is illustrated as being implemented at computing device 118, however, in alternate implementations, controller 120 may be integrated within interactive cord 102, or implemented with another device, such as powered headphones, a lamp, a clock, and so forth.

Having discussed an example environment 100 in which interactive cord 102 may be implemented, consider now a more-detailed discussion of fabric cover 104.

Fabric cover 104 may be formed in a variety of different ways. In one or more implementations, the weave pattern of fabric cover 104 causes conductive threads 108 to be exposed at capacitive touchpoints 112, but covered and hidden from view at other areas of fabric cover 104.

Figure 4:
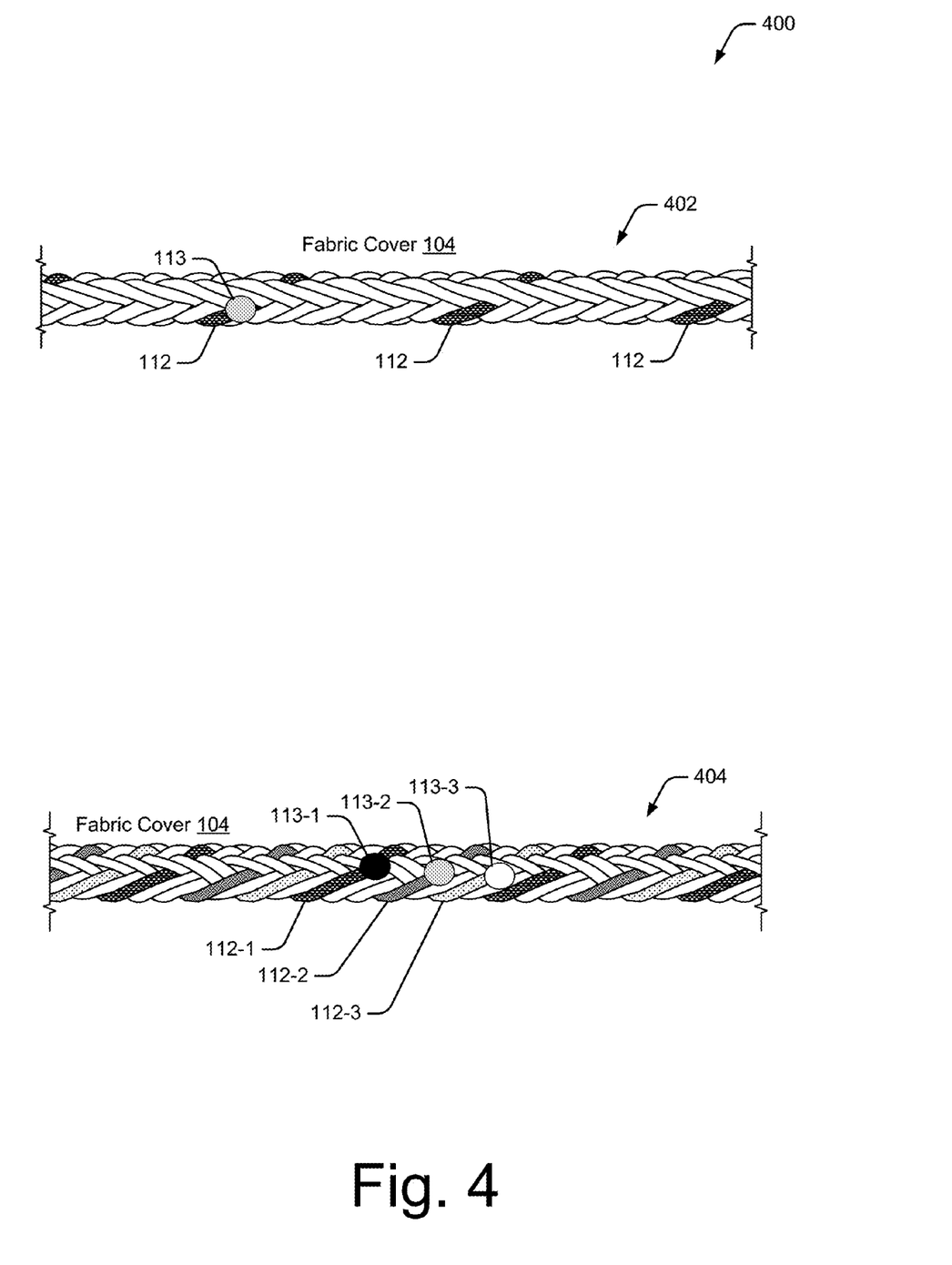
FIG. 4 illustrates examples of a fabric cover with integrated light sources in accordance with one or more implementations.

Consider, for example, FIG. 4 which illustrates examples 400 of fabric cover 104 with integrated light sources in accordance with one or more implementations. In a first example, at 402, fabric cover 104 includes a single conductive thread, or single set of conductive threads 108, woven with non-conductive threads 110, to form capacitive touchpoints 112. Notably, the one or more conductive threads 108 correspond to a first color (black) which is different than a second color (white) of non-conductive threads 110 woven into the fabric cover.

In this example, the weave pattern of fabric cover 104 exposes conductive thread 108 at capacitive touchpoints 112 along fabric cover 104. However, conductive thread 108 is covered and hidden from view at other areas of fabric cover 104. Touch input to any of capacitive touchpoints 112 causes a change in capacitance to conductive thread 108, which may be detected by controller 120. However, touch input to other areas of fabric cover 104 formed by non-conductive thread 110 does not cause a change in capacitance to conductive thread 108.

In one or more implementations, fabric cover 104 includes at least a first conductive thread 108 and a second conductive thread 108. The first conductive thread 108 is substantially parallel to the second conductive thread at one or more capacitive touchpoints 112 of fabric cover 104, but twisted with second conductive thread 108 at other areas of fabric cover 104. Capacitive touchpoints 112 are formed at the areas of fabric cover 104 at which the first and second conductive threads are parallel to each other because bringing a finger close to capacitive touchpoints 112 will cause a difference in capacitance that can be detected by controller 120. However, in the regions where conductive threads 108 are twisted, the closeness of the finger to conductive threads 108 has equal effect on the capacitance of both conductive threads 108, which avoids false triggering if the user touches the conductive thread 108. Notably, therefore, conductive thread 108 may not need to be covered by non-conductive thread 110 in this implementation.

Visual cues can be formed within fabric cover 104 to provide an indication to the user as to where to touch interactive cord 102 to initiate various functions. In one or more implementations, conductive threads 108 correspond to one or more first colors which are different than one or more second colors of non-conductive threads 110 woven into fabric cover 104. For example, at 402, the color of conductive thread 108 is black, whereas the remainder of the fabric cover is white, which enables the user to recognize where to touch fabric cover 104. Alternately or additionally, the one or more conductive threads 108 can be woven into fabric cover 104 to create one or more tactile capacitive touchpoints by knitting or weaving of the thread to create a tactile cue that can be felt by the user. For example, capacitive touchpoints 112 can be formed to protrude slightly from fabric cover 104 in a way that can be felt by the user when touching interactive cord 102.

In one or more implementations, the visual cues may be provided by light sources 113. For instance, in example 402, light source 113 is integrated with fabric cover 104 proximate light source 112. As discussed above, light source 113 can be controlled to output light to indicate the position of a capacitive touchpoint 112 and/or to provide feedback to the user based on the user's interactions with interactive cord 102.

In the example fabric cover 104 illustrated at 402, controller 120 is able to detect touch input to the various capacitive touchpoints 112. However, controller 120 may be unable to distinguish touch input to a first capacitive touchpoint 112 from touch input to a second, different, capacitive touchpoint 112. In this implementation, therefore, the number of functions that can be triggered using interactive cord 102 is limited.

However, capacitive touchpoints 112 that are electrically distinct can be made by incorporating multiple sets of conductive threads 108 into fabric cover 104 to create multiple different capacitive touchpoints 112 which can be distinguished by controller 120. For example, fabric cover 104 may include one or more first conductive threads 108 and one or more second conductive threads 108. The one or more first conductive threads 108 can be woven into fabric cover 104 such that the one or more first conductive threads 108 are exposed at one or more first capacitive touchpoints 112, and the one or more second conductive threads 108 can be woven into fabric cover 104 such that the one or more second conductive threads 108 are exposed at one or more second capacitive touchpoints 112. Doing so enables controller 120 to distinguish touch input to the one or more first capacitive touchpoints 112 from touch input to the one or more second capacitive touchpoints 112.

As an example, at 404 fabric cover 104 is illustrated as including multiple electrically distinct capacitive touchpoints 112, which are visually distinguished from each other by using threads of different colors and/or patterns. For example, a first set of conductive thread is colored black with dots to form capacitive touchpoints 112-1, a second set of conductive thread is gray with dots to form capacitive touchpoints 112-2, and a third set of conductive thread is colored white with dots to form capacitive touchpoints 112-3. The weaving pattern of fabric cover 104 surfaces capacitive touchpoints 112-1, 112-2, and 112-3 at regular intervals along fabric cover 104 of interactive cord 102.

In one or more implementations, the visual cues may be provided by light sources 113. For instance, in example 404, a light source 113-1 is integrated with fabric cover 104 proximate capacitive touchpoint 112-1, a light source 113-2 is integrated with fabric cover 104 proximate capacitive touchpoint 112-2, and a light source 113-3 is integrated with fabric cover 104 proximate capacitive touchpoint 112-3. As discussed above, light sources 113-1, 113-2, and 113-3 can be controlled to output light to indicate the position of the respective capacitive touchpoint 112-1, 112-2, or 112-3, and/or to provide feedback to the user based on the user's interaction with the respective capacitive touchpoint 112-1, 112-2, or 112-3. In one or more implementations, each of the light sources 113-1, 113-2, and 113-3 may be a different color in order to visually distinguish the capacitive touchpoints 112-1, 112-2, and 112-3.

In this case, each of the different capacitive touchpoints 112-1, 112-2, and 112-3 may be associated with a different function. For example, the user may be able to touch capacitive touchpoint 112-1 to trigger a first function (e.g., playing or pausing a song), touch capacitive touchpoint 112-2 to trigger a second function (e.g., adjusting the volume of the song), and touch capacitive touchpoint 112-3 to trigger a third function (e.g., skipping to a next song).

In some cases, a combination, sequence, or pattern of touches to capacitive touchpoints 112 may trigger different functions. For example, the user may be able to touch capacitive touchpoints 112-1 and 112-2 at the same time in order to trigger a fourth function (e.g., fast forwarding the song).

Fabric cover 104 can be formed using a variety of different weaving or braiding techniques. In example 404, fabric cover 104 is formed by weaving the one or more conductive threads into fabric cover 104 using a loop braiding technique. Doing so causes the one or more capacitive touchpoints to be formed by one or more split loops. In example 404, fabric cover 104 includes 3 different split loops, one for each of the three different types of conductive threads to form capacitive touchpoints 112-1, 112-2, and 112-3. The split loops are placed at particular locations in the pattern to provide isolation between the conductive threads and align them in a particular way. Doing so produces a hollow braid in mixed tabby, and 3/1 twill construction. This gives columns ("wales") along the length of the braid which exposes lengths of the different fibers. This pattern ensures that each of the conductive threads 108 are in an isolated conductive area, which enables controller 120 to easily detect which conductive thread 108 is being touched, and which is not, at any given time.

Audio signals are particularly vulnerable to RF interference. Thus, cords for headsets, cable TV, and other types of audio/visual wiring often contain foil or stranded wire wrapped around the signal conductors to protect the signal from radio frequency interference and to provide an electrical ground. Headset cords and other media cords also often have a woven fabric outer layer to provide some physical protection to the electrical cords, to help avoid tangling, and to improve the feel and appearance of the wires.

Thus, in one or more implementations, fabric cover 104 acts as an RF shield for cable 106, thereby reducing the need to manufacture interactive cord 102 with a separate RF shield. In addition, fabric cover 104 creates an attractive and protective covering for interactive cord 102 that also helps to prevent tangling.

Having discussed various examples of fabric cover 104, consider now a more-detailed discussion of how controller 120 controls light sources 113 and detects touch input to fabric cover 104 to trigger various functions.

Figure 5:
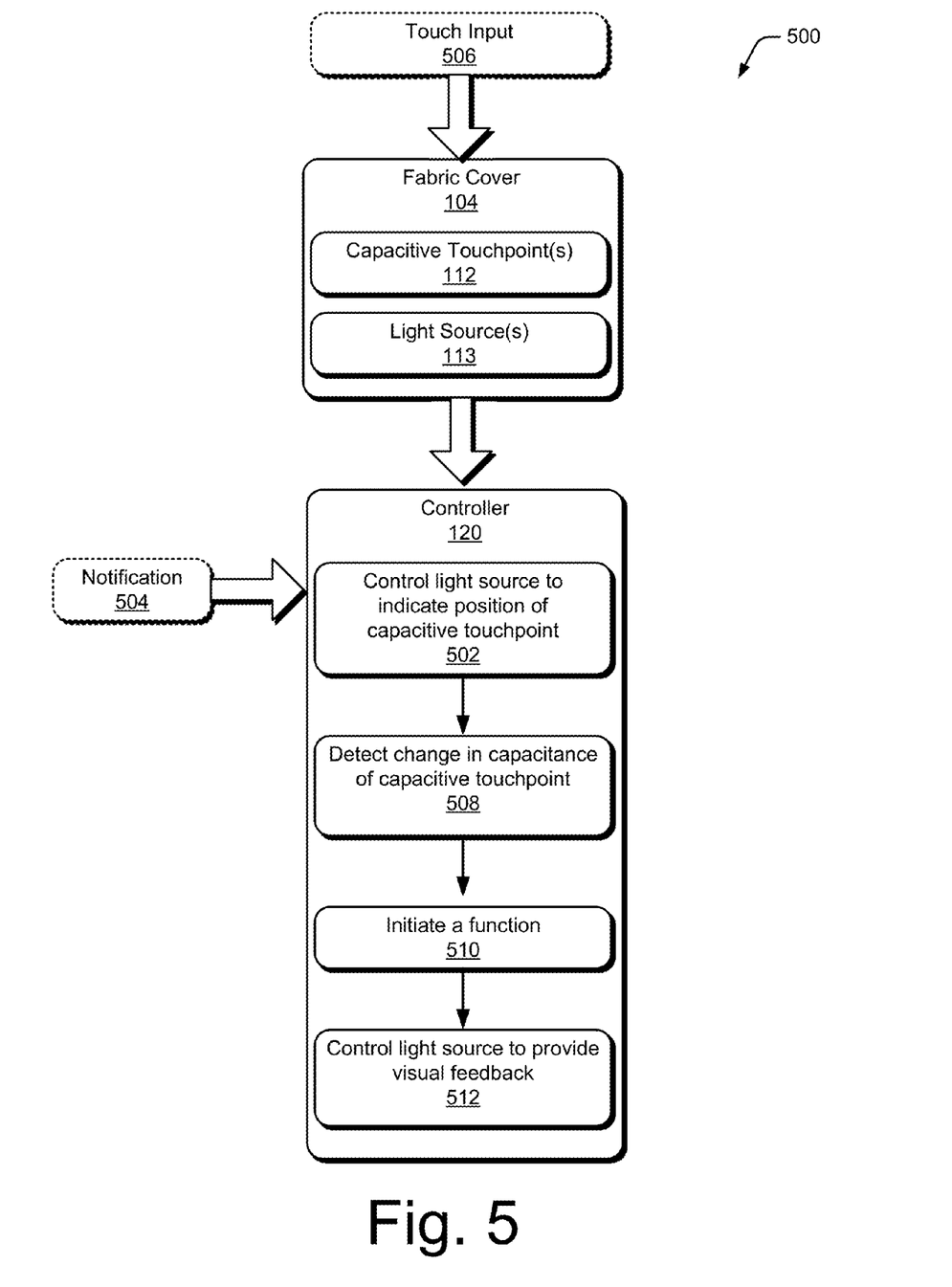
FIG. 5 illustrates an example system configured to control light sources and to detect touch input to a capacitive touchpoint of a fabric cover.

FIG. 5 illustrates an example system 500 configured to control light sources and to detect touch input to a capacitive touchpoint of a fabric cover.

In system 500, at 502, controller 120 controls one or more light sources 113 to output light to visually indicate a position of one or more respective capacitive touchpoints 112 on fabric cover 104. In one or more implementations, light sources 113 can be controlled in response to a notification 504, such as an incoming call. In this case, controller 120 controls one or more light sources 113 that are positioned proximate a capacitive touchpoint 112 that is associated with notification 504. For example, if notification 504 corresponds to an incoming call, controller 120 may control a light source 113, that is positioned proximate a capacitive touchpoint 112 associated with answering incoming calls. In this way, controller 120 enables the user to quickly and easily determine the capacitive touchpoint 112 that can be selected in order to answer the incoming call.

In system 500, touch input 506 is provided to one or more capacitive touchpoints 112 of fabric cover 104. The touch input 506 may be provided to a capacitive touchpoint 112 that is associated with a light source 113 controlled to output light at 502. By way of example, consider FIG. 6, which illustrates examples 600 of providing touch input to a fabric cover of an interactive cord with integrated light sources in accordance with one or more implementations. At 602, a finger 604 of a user's hand provides touch input by touching a capacitive touchpoint 112 of fabric cover 104 of interactive cord 102. In some cases, the touch input can be provided by moving finger 604 close to capacitive touchpoint 112 without physically touching the capacitive touchpoint. In this example, a light source 113, positioned proximate capacitive touchpoint 112, outputs light to indicate a position of the capacitive touchpoint 112 on fabric cover 104.

Figure 6:
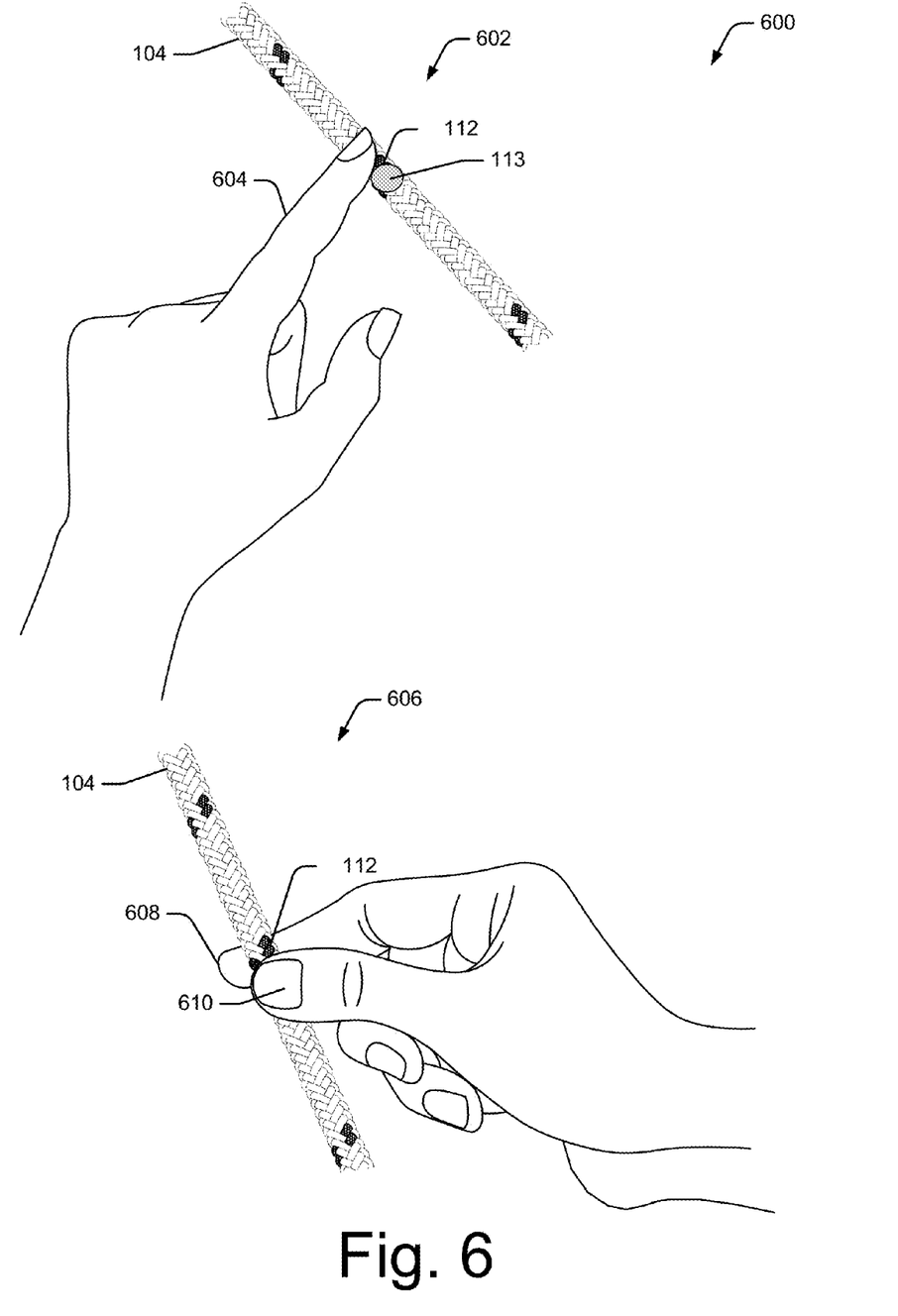
FIG. 6 illustrates examples of providing touch input to a fabric cover of an interactive cord with integrated light sources in accordance with one or more implementations.

A variety of different types of touch input 506 may be provided. In one or more implementations, touch input 506 may correspond to a pattern or series of touches to fabric cover 104, such as by touching a first capacitive touchpoint 112 followed by touching a second capacitive touchpoint 112. In one or more implementations, different types of touch input 506 may be provided based on the amount of pressure applied to capacitive touchpoint 112. As an example, at 606 an index finger 608 and a thumb 610 of the user's hand provides touch input by pinching a capacitive touchpoint 112 of fabric cover 104. Doing so may trigger a function that is different than a function triggered by simply touching or tapping capacitive touchpoint 112. In one or more implementations, a first touch to capacitive touchpoint 112 may cause the controller 120 to generate an audible alert that lets the user know that if a second tap is provided to the same capacitive touchpoint, the touch will be registered. For example, the user might tap a capacitive touchpoint 112, and in response hear a "volume up", indicating that this touchpoint is correlated to turning the volume up. The user may then squeeze the same touchpoint in order to confirm the volume up command. In this way, the user is less likely to initiate the controls unintentionally.

Returning to FIG. 5, at 508 controller 120 detects a change in capacitance to conductive thread 108, associated with capacitive touchpoint 112, when touch input 506 is provided to capacitive touchpoint 112 of fabric cover 104. To sense touch input 506, controller 120 may use a capacitance meter that can detect the change in capacitance of a single conductive thread or between two conductive threads disposed parallel to each other. Generally, when a finger touches, or comes in close contact to, capacitive touchpoint 112, a capacitance is formed between the finger and the associated conductive thread 108. This capacitance may be detected by the capacitance meter of controller 120 to determine that the touch input has occurred.

Controller 120 may be implemented to detect the change in capacitance in a variety of different ways. In one or more implementations, controller 120 can be implemented to detect a change in capacitance between two conductive threads 112 woven into interactive cord 102. As described above, two conductive threads 108 can be placed parallel or interlaced to each other at capacitive touchpoints 112. In this case, one of the conductive threads 108 can be grounded and the other conductive thread 108 can be connected to the capacitance meter. Initially, the capacitance meter will measure a small baseline capacitance between the two conductive threads. However, when a finger of the user's hand touches the conductive threads at capacitive touchpoint 112, a capacitive coupling occurs with each of the conductive threads 108. In response, the capacitance meter detects a new combined capacitance which is larger than the small baseline capacitance. This change in capacitance enables controller 120 to detect touch input 506.

In one or more implementations, controller 120 can determine the amount of pressure applied to capacitive touchpoint 112, which may enable controller 120 to distinguish a light tap from a hard press or pinch. For example, if the finger is pressed harder, or if two fingers pinch capacitive touchpoint 112, the capacitance meter will detect an even greater capacitance value. Thus, controller 120 can determine whether touch input 506 corresponds to a tap or a pinch by comparing the detected capacitance to predetermined capacitance thresholds for a touch or pinch.

In one or more implementations, controller 120 can be implemented to monitor and detect the change in capacitance of a single conductive thread 108 woven into interactive cord 102. In this case, the single conductive thread 108 is not grounded. When not being touched, only a small baseline capacitance exists which may be monitored by the capacitance meter. When a user's finger comes in the vicinity of the conductive thread 108, however, a touch-input capacitance is formed between the fingertip and the conductive thread. This capacitance is electrically connected in parallel to the baseline capacitance, causing the capacitance meter to detect the touch input. Similar to when the capacitance is measured between two conductive threads, a stronger pressing will create a larger capacitance. This method may be more resistant to false touches due to moisture (e.g., rain or sweat) permeating fabric cover 104.

At 510, in response to detecting the change in capacitance, controller 120 triggers a function associated with touch input 506. Notably, controller 120 can trigger a variety of different types of functions based on the how interactive cord 102 is being utilized. For example, when interactive cord 102 corresponds to a cord for a headset, controller 120 may trigger functions such as answering an incoming call, playing audio (e.g., a song, video, audiobook file, or voice memo), pausing audio, fast forwarding audio, skipping to a next audio track, adjusting the volume of the audio, and so forth. As another example, when interactive cord corresponds to a data transfer cord, controller 120 may trigger functions such as starting the transfer of data, stopping the transfer of data, authenticating the user to enable the transfer of data, and so forth. When interactive cord 102 corresponds to a cord for an appliance (e.g., a lamp, a fan, or an alarm clock), controller 120 may trigger functions such as turning on or off the appliance, adjusting the brightness of a lamp, adjusting the speed of a fan, hitting the snooze button on an alarm clock, and so forth.

As described throughout, different functions may be mapped to different types of touch input to fabric cover 104 of interactive cord 102. In some cases, a specific function may be associated with a specific capacitive touchpoint 112. For instance, in example 404 of FIG. 4, the user may be able to touch first capacitive touchpoint 112-1 to trigger a first function (e.g., playing or pausing a song), touch second capacitive touchpoint 112-2 to trigger a second function (e.g., adjusting the volume of the song), and touch third capacitive touchpoint 112-3 to trigger a third function (e.g., skipping to a next song).

In some cases, functions may be associated with various combinations, sequences, or patterns of touch input to multiple touchpoints. For example, a function may be associated with first touching capacitive touchpoint 112-1, and then sliding the user's finger to second capacitive touchpoint 112-2.

In some cases, the function that is triggered may be based on the pressure applied to capacitive touchpoints 112. For example, a first function may be associated with tapping a capacitive touchpoint 112, and a second function may be associated with squeezing or pinching the same capacitive touchpoint.

In one or more implementations, interactive cord 102 can be used to authenticate a user. For example, rather than requiring a password to be entered into a computing device, a touch input pattern can be provided to interactive cord 102 to authenticate the user.

At 512, controller 120 controls light source 113 to provide feedback to the user. For example, controller 120 may provide current to light source 113 to cause light source 113 to output light to provide visual feedback to the user indicating that the touch input has been detected and registered, such as by changing colors, flashing, changing the flashing rate, blinking, and so forth. In some cases, light source 113 is configured to output a first type of light (e.g., a particular color of light or flashing at a particular rate) to visually indicate the position of the capacitive touchpoint on the fabric cover, and to output a second type of light (e.g., a different color of light or flashing at a different rate) to provide the feedback. For example, light source 113 can output red light to indicate the position of capacitive touchpoint 112 at step 502, and then output blue light to provide feedback indicating that touch input to capacitive touchpoint 112 has been detected at step 512. Notably, controller 120 may control light source 113 to provide the feedback prior to, after, or at least partially concurrently with initiating the function at step 510.

Example Methods

Figure 7:
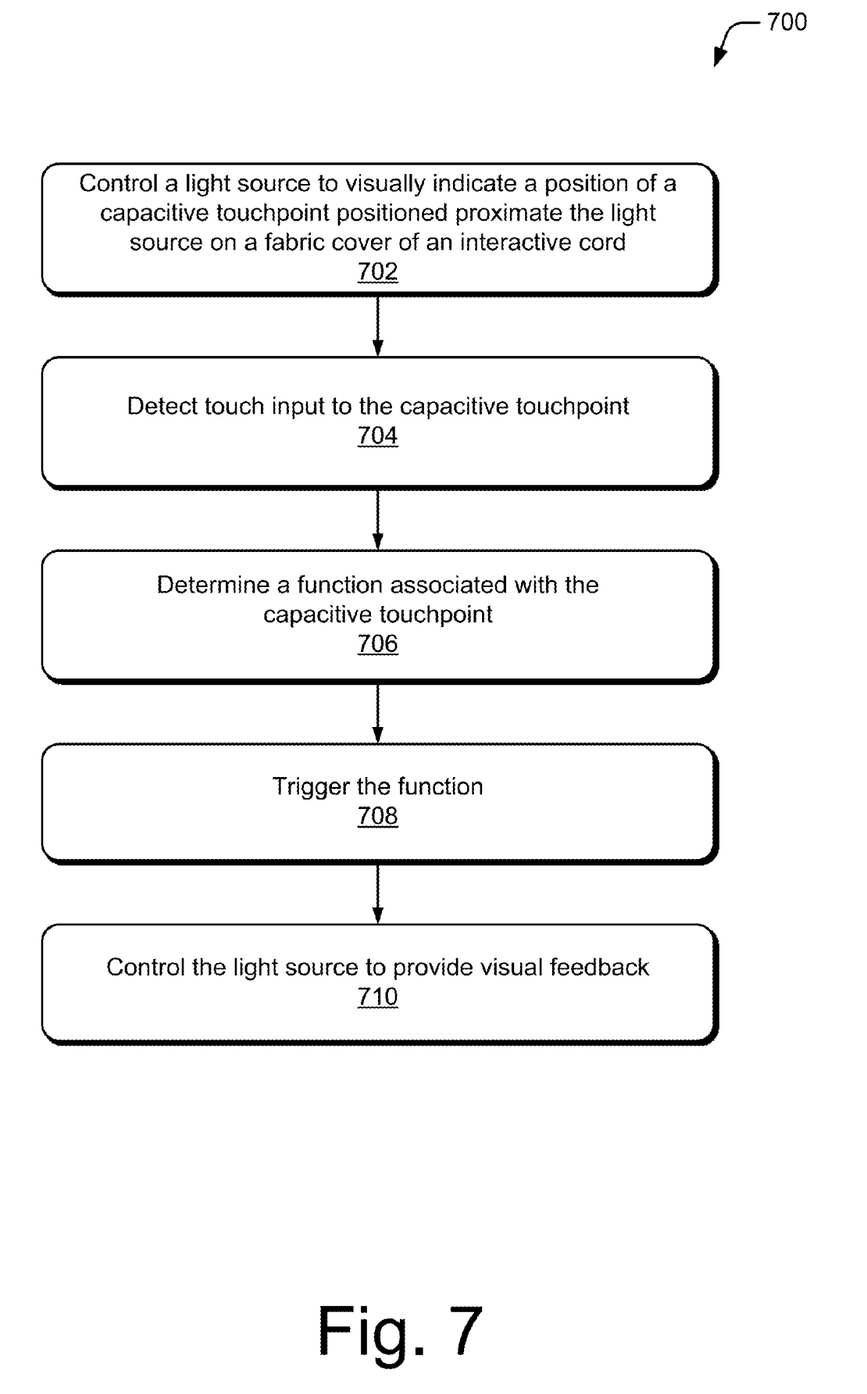
FIG. 7 illustrates an example method of controlling a light source and triggering a function based on touch input to a capacitive touchpoint of an interactive cord.

FIG. 7 illustrates an example method 700 of controlling a light source and triggering a function based on touch input to a capacitive touchpoint of an interactive cord. This method is shown as a set of blocks that specify operations performed but are not necessarily limited to the order or combinations shown for performing the operations by the respective blocks. The techniques are not limited to performance by one entity or multiple entities operating on one device.

At 702, a light source is controlled to visually indicate a position of a capacitive touchpoint positioned proximate the light source on a fabric cover of an interactive cord. For example, controller 120 controls one or more light sources 113 to output light to visually indicate a position of one or more respective capacitive touchpoints 112 on fabric cover 104 of interactive cord 102. In one or more implementations, light sources 113 can be controlled in response to a notification, such as an incoming call. In this case, controller 120 controls one or more light sources 113 that are positioned proximate a capacitive touchpoint 112 that is associated with notification 504. For example, if notification 504 corresponds to an incoming call, controller 120 may control a light source 113, that is positioned proximate a capacitive touchpoint 112 configured to answer the incoming call. In this way, controller 120 enables the user to quickly and easily determine the capacitive touchpoint 112 that can be selected in order to answer the incoming call.

At 704, touch input to the capacitive touchpoint is detected. For example, controller 120 (FIG. 1) detects touch input 506 to capacitive touchpoint 112 of interactive cord 102 when an object, such as a user's finger, touches capacitive touchpoint 112.

At 706, a function associated with the capacitive touchpoint is determined. For example, controller 120 determines a function associated with the capacitive touchpoint 112 that received the touch input at step 802.

At 708, the function is triggered. For example, controller 120 triggers the function determined at step 804. Notably, controller 120 can trigger a variety of different types of functions based on the how interactive cord 102 is being utilized. For example, when interactive cord 102 corresponds to a cord for a headset, controller 120 may trigger functions such as answering an incoming call, playing audio (e.g., a song, video, audiobook file, or voice memo), pausing audio, fast forwarding audio, skipping to a next audio track, adjusting the volume of the audio, and so forth. As another example, when interactive cord corresponds to a data transfer cord, controller 120 may trigger functions such as starting the transfer of data, stopping the transfer of data, authenticating the user to enable the transfer of data, and so forth. When interactive cord 102 corresponds to a cord for an appliance (e.g., a lamp, a fan, or an alarm clock), controller 120 may trigger functions such as turning on or off the appliance, adjusting the brightness of a lamp, adjusting the speed of a fan, hitting the snooze button on an alarm clock, and so forth.

At 710, the light source is controlled to provide visual feedback. For example, controller 120 may provide current to light source 113 to cause light source 113 output light to provide visual feedback to the user indicating that the touch input has been detected and registered, such as by changing colors, flashing, changing the flashing rate, blinking, and so forth. In some cases, light source 113 is configured to output a first type of light (e.g., a particular color of light or flashing at a particular rate) to visually indicate the position of the capacitive touchpoint on the fabric cover, and to output a second type of light (e.g., a different color of light or flashing at a different rate) to provide the feedback. For example, light source 113 can output red light to indicate the position of capacitive touchpoint 112 at step 702, and then output blue light to provide feedback indicating that touch input to capacitive touchpoint 112 has been detected at step 710. Notably, controller 120 may control light source 113 prior to, after, or at least partially concurrently with triggering the function at step 708.

Example Computing System

Figure 8:
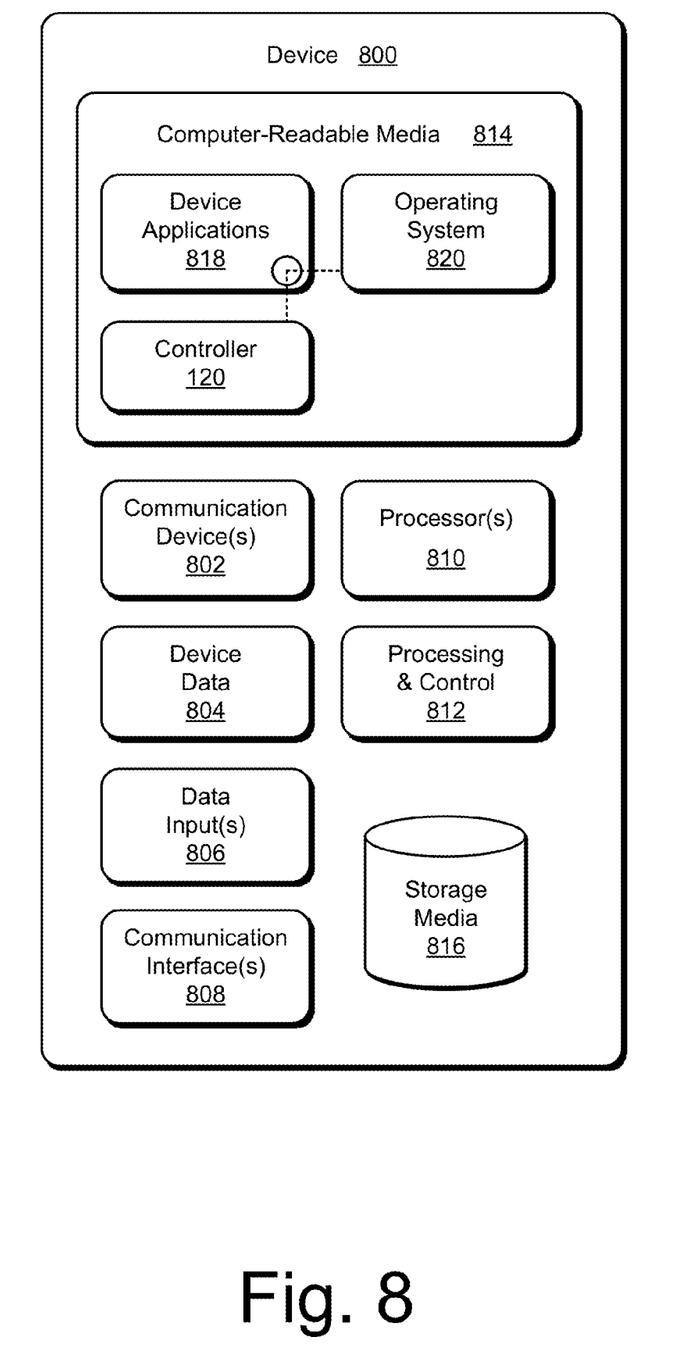
FIG. 8 illustrates various components of an example computing system that can be implemented as any type of client, server, and/or computing device as described with reference to the previous FIGS. 1-7 to implement an interactive cord with integrated light sources.

FIG. 8 illustrates various components of an example computing system 800 that can be implemented as any type of client, server, and/or computing device as described with reference to the previous FIGS. 1-7 to implement an interactive cord with integrated light sources. In embodiments, computing system 800 can be implemented as one or a combination of a wired and/or wireless wearable device, System-on-Chip (SoC), and/or as another type of device or portion thereof. Computing system 800 may also be associated with a user (e.g., a person) and/or an entity that operates the device such that a device describes logical devices that include users, software, firmware, and/or a combination of devices.

Computing system 800 includes communication devices 802 that enable wired and/or wireless communication of device data 804 (e.g., received data, data that is being received, data scheduled for broadcast, data packets of the data, etc.). Device data 804 or other device content can include configuration settings of the device, media content stored on the device, and/or information associated with a user of the device. Media content stored on computing system 800 can include any type of audio, video, and/or image data. Computing system 800 includes one or more data inputs 806 via which any type of data, media content, and/or inputs can be received, such as human utterances, touch data generated by interactive cord 102, user-selectable inputs (explicit or implicit), messages, music, television media content, recorded video content, and any other type of audio, video, and/or image data received from any content and/or data source.

Computing system 800 also includes communication interfaces 808, which can be implemented as any one or more of a serial and/or parallel interface, a wireless interface, any type of network interface, a modem, and as any other type of communication interface. Communication interfaces 808 provide a connection and/or communication links between computing system 800 and a communication network by which other electronic, computing, and communication devices communicate data with computing system 800.

Computing system 800 includes one or more processors 810 (e.g., any of microprocessors, controllers, and the like), which process various computer-executable instructions to control the operation of computing system 800 and to enable techniques for, or in which can be embodied, interactive cord. Alternatively or in addition, computing system 800 can be implemented with any one or combination of hardware, firmware, or fixed logic circuitry that is implemented in connection with processing and control circuits which are generally identified at 812. Although not shown, computing system 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 800 also includes computer-readable media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 800 can also include a mass storage media device 816.

Computer-readable media 814 provides data storage mechanisms to store device data 804, as well as various device applications 818 and any other types of information and/or data related to operational aspects of computing system 800. For example, an operating system 820 can be maintained as a computer application with computer-readable media 814 and executed on processors 810. Device applications 818 may include a device manager, such as any form of a control application, software application, signal-processing and control module, code that is native to a particular device, a hardware abstraction layer for a particular device, and so on.

Device applications 818 also include any system components, engines, or managers to implement interactive cord. In this example, device applications 818 include controller 120.

CONCLUSION

Although embodiments of techniques using, and objects including, an interactive cord with integrated light sources have been described in language specific to features and/or methods, it is to be understood that the subject of the appended claims is not necessarily limited to the specific features or methods described. Rather, the specific features and methods are disclosed as example implementations of interactive cord with integrated light sources.

What is claimed is:
1. An interactive cord comprising:
a cable; and
a fabric cover that covers the cable, the fabric cover comprising:
one or more conductive threads woven into the fabric cover to form a capacitive touchpoint, the capacitive touchpoint configured to enable reception of touch input that causes a change in capacitance to the one or more conductive threads, the change in capaci- tance effective to trigger one or more functions associated with the capacitive touchpoint; and
a light source configured to output light.

2. The interactive cord of claim 1, wherein the light source is further configured to output the light proximate a capacitive touchpoint to visually indicate a position of the capacitive touchpoint on the fabric cover.

3. The interactive cord of claim 1, wherein the light source is further configured to provide feedback by outputting light responsive to detecting touch input to the capacitive touch point.

4. The interactive cord of claim 1, wherein the light source is configured to output a first type of light to visually indicate a position of the capacitive touchpoint on the fabric cover, and to output a second type of light to provide feedback.

5. The interactive cord of claim 1, wherein the light source is configured to output light to visually indicate a position of a capacitive touchpoint on the fabric cover in response to receiving a notification associated with the capacitive touchpoint.

6. The interactive cord of claim 5, wherein the notification comprises an incoming call, and wherein selection of the capacitive touchpoint is effective to answer the incoming call.

7. The interactive cord of claim 1, wherein the light source is further configured to output light to indicate a transfer of data or power through the interactive cord.

8. The interactive cord of claim 1, wherein the light source is positioned near a base of the interactive cord and coupled to an optical fiber that is integrated into the fabric cover, and wherein the light source is configured to emit light into the optical fiber to cause the optical fiber to output light proximate one or more capacitive touchpoints.

9. The interactive cord of claim 1, wherein the interactive cord comprises a cord for ear buds or headphones, a data transfer cord, or a power cord.

10. A method comprising:
controlling a light source to visually indicate a position of a capacitive touchpoint woven into a fabric cover;
detecting touch input to the capacitive touch point woven into the fabric cover;
initiating a function based on the touch input; and
controlling the light source to provide visual feedback.

11. The method of claim 10, wherein the light source is positioned proximate the capacitive touchpoint on the fabric cover.

12. The method of claim 10, wherein the controlling the light source further comprises causing the light source to output light or causing the light source to flash at a particular rate.

13. The method of claim 10, wherein the controlling the light source to visually indicate the position of the capacitive touchpoint woven into the fabric cover is performed responsive to receiving a notification, and wherein the capacitive touchpoint is associated with the notification.

14. A system comprising:
an interactive cord comprising a fabric cover, the fabric cover comprising one or more conductive threads woven into the fabric cover to form one or more capacitive touchpoints, and one or more light emitting diodes (LED's); and
a controller coupled to the interactive cord, the controller configured to detect touch input to the one or more capacitive touchpoints and control a respective LED to indicate that the touch input is detected.

15. The system of claim 14, wherein the controller is configured to control the respective LED by sending current through a conductive thread coupled to the LED to power the LED.

16. The system of claim 14, wherein the LED is coupled to one of the conductive threads of the capacitive touchpoint, and wherein the controller is configured to switch between sending current through the conductive thread to power the LED, and monitoring the conductive thread to detect touch input at the capacitive touchpoint.

17. The system of claim 14, wherein the controller is further configured to control the respective LED to visually indicate a position of the capacitive touchpoint on the fabric cover.

18. The system of claim 17, wherein the controller is configured to control the LED to output a first type of light to visually indicate the position of the capacitive touchpoint on the fabric cover, and to output a second type of light to indicate that the touch input is detected.

19. The system of claim 18, wherein the first type of light comprises a first color of light or flashing the light at a first rate, and wherein the second type of light comprises a second color of light or flashing the light at a second rate.

20. The system of claim 17, wherein the controller is configured to control the respective LED to visually indicate a position of the capacitive touchpoint on the fabric cover in response to receiving a notification associated with the capacitive touchpoint.

* * * * *